UNITED STATES PATENT OFFICE.

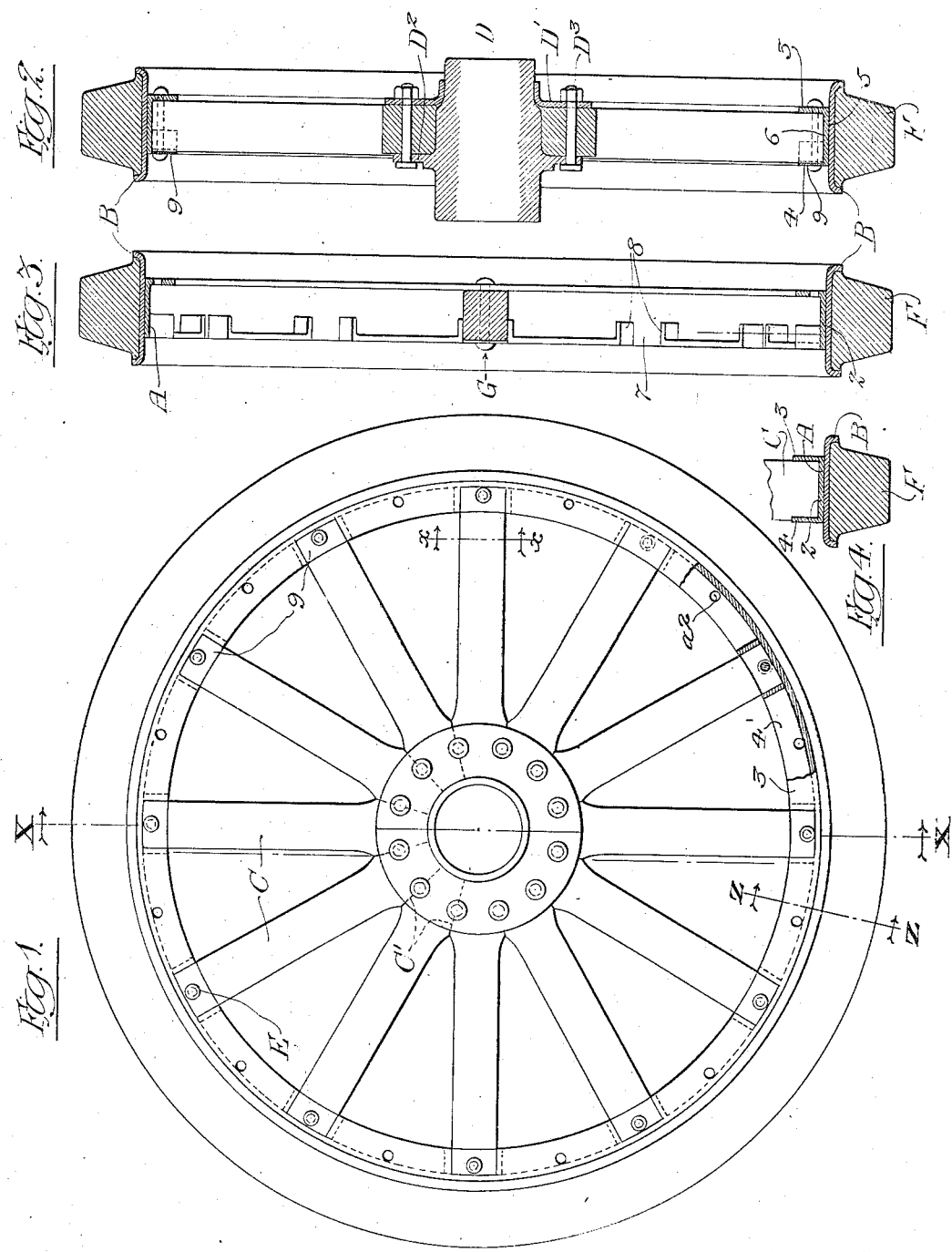

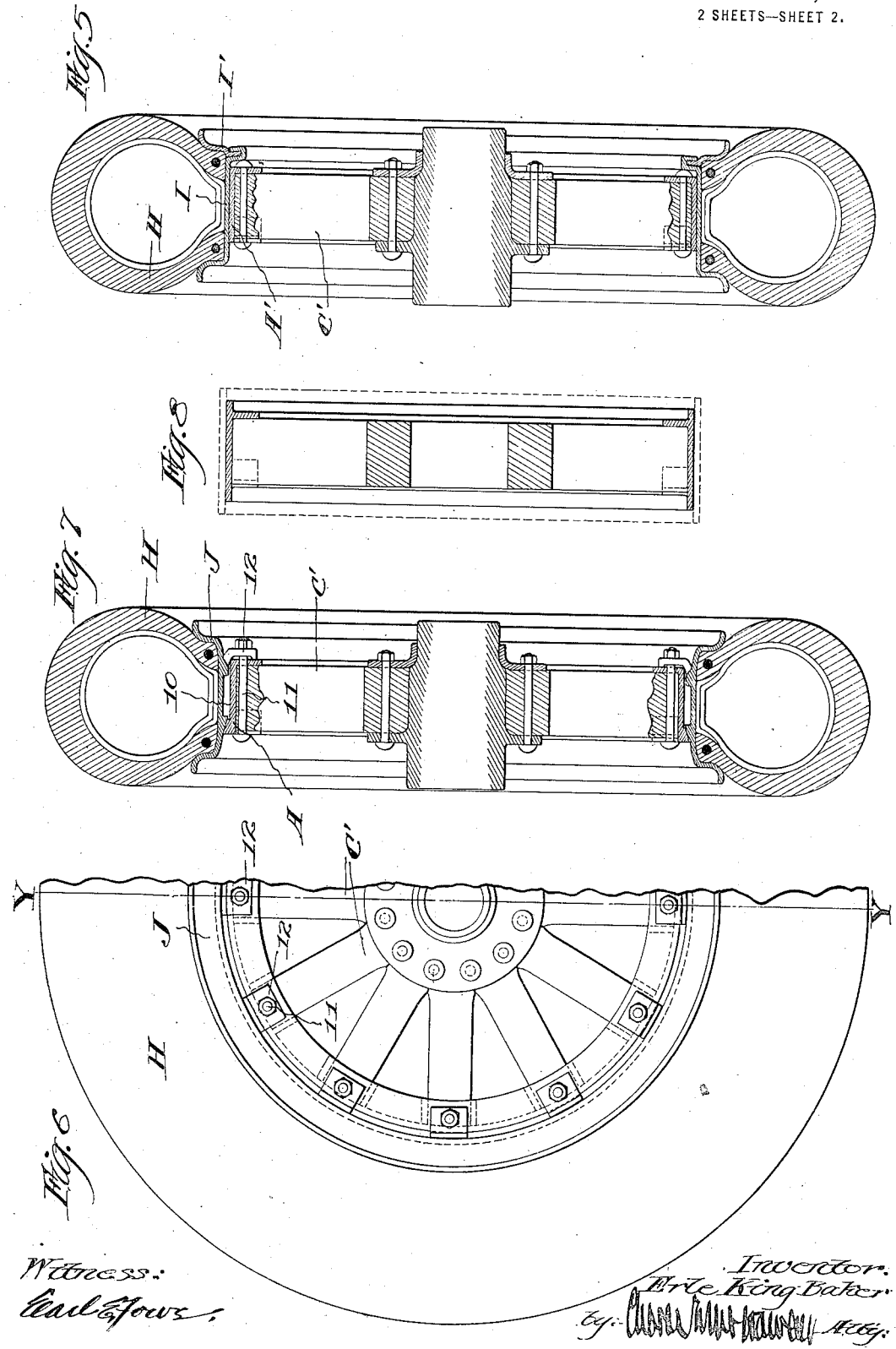

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL FOR MOTOR-TRUCKS.

1,321,002.  Specification of Letters Patent.  Patented Nov. 4, 1919.

Application filed May 16, 1918. Serial No. 234,843.

*To all whom it may concern:*

Be it known that I, ERLE K. BAKER, a citizen of the United States, and a resident of Chicago, county of Cook, and State of Illinois, have invented new and useful Improvements Entitled Semiwood Wheels for Motor-Trucks, of which the following is a specification.

My invention relates to improvements in automobile truck wheels of the kind equipped with fixed rims and tires and also of the kind used with demountable rims and pneumatic tires.

The object of my invention is to simplify the construction of such wheels;—to lessen the weight thereof;—and to reduce their cost, all without sacrifice of strength, durability or appearance.

I accomplish these objects chiefly through the elimination of unnecessary parts whether of wood or metal;—for, as will appear hereinafter, I dispense with the customary wood felly, also with the mortising and tenoning of felly and spokes which I find objectionable on account of the weight which they add to the weight of the wheel, and which represent a large part of the cost of ordinary automobile wheels. As will be understood from the following description, I have invented a truck wheel which is fully as strong or stronger than the wheels now in use, which is of less over-all weight, which is of a minimum peripheral weight, which may be manufactured more rapidly, and at less cost than like wooden wheels of the present type;—and wherein I attain all of the well-known advantages of wooden spokes, as compared either with the metal disks or with the metal spokes which have been offered as substitutes; and incidentally, I entirely dispense with the usual heavy and expensive wood or metal felly of rectangular or box-like cross-section.

While not limited to the specific structure herein depicted, my invention will be readily understood on reference to the accompanying drawings in which: Figure 1 is a side view of a truck wheel embodying my invention;—Fig. 2 is a section on the line X—X of Fig. 1;—Fig. 3 is a like view with all except one of the spokes omitted;—Fig. 4 is a section on the line Z—Z of Fig. 1;—Fig. 5 is a section on the plane of the wheel axis, showing it as modified to receive a fixed rim of the Q. D. type and a pneumatic truck tire;—Fig. 6 is a side view of one-half of a wheel of modified form adapted for use with a demountable rim and tire, whether of the pneumatic or solid type;—Fig. 7 is a sectional view on the line Y—Y of Fig. 6;—and Fig. 8 illustrates a further cross-sectional modification of the metal peripheral member of the wheel.

Having determined that the ordinary wheel felly whether of wood or of metal is objectionable on the ground of weight, and because of its initial cost and the expense of assembling it with the spokes and the metal felly band ordinarily used, I completely discard such a felly and its separate felly band or fixed rim, and substitute therefor a lighter and more efficient metal part which is in the nature of a combined felly band and felly. This part serves as the circumferential seat for the demountable rim, and at the same time serves as the part to which the spoke-ends are secured;—and when used with a demountable rim serves, together with the spoke ends, as the base upon which the rim-clamping devices are secured. I construct this peripheral member (the combined felly band and felly) in such manner that the spokes may be assembled therewith by a straight sliding motion of the ends of the spokes against the inner periphery of said member; whereby I am enabled to use spokes of maximum length, and therewith to circumferentially tension the peripheral member and drive the mitered ends of the spokes together with a degree of accuracy and tightness never before attainable in wood wheels.

In Figs. 1, 2, 3 and 4 of the drawings, the combined fellyband and felly, to which I have referred, is marked A;—the tire-rim with which it co-acts, is marked B;—the wheel spokes are marked C;—the wheel hub is marked D, and its fixed hub-flange, $D^2$. The parts A, B, and D, are made of metal;—the spokes C are made of wood. The other separate parts which enter the structure of the wheel are the spoke-fastening rivets or bolts, E, whereby I preferably secure the spoke-ends to the peripheral member, A. The loose hub flange, $D^1$, and the hug bolts, $D^3$, are counted as belonging to the hub. It remains only to mention the solid rubber tire, F; which following the usual practice is vulcanized on the rim, B.

The rim, B, is hydraulically "pressed on" the peripheral member, A, in the same manner as upon the felly band of wooden fellied wheels. From this brief description it will be plain that my novel wheel is of the most simple construction. The forms and functions of the individual parts, their interrelation and co-action may now be considered.

The metal hub, D, here shown, with its spaced hub flanges, $D^1$ and $D^2$, and its hub bolts, $D^3$, represents any one of the several well-known automobile truck hubs. The mitered or wedge-shaped butts, $C^1$, of the wooden spokes constitute the central or hub-portion of the wooden portion, or body, of the wheel, and are bound or clamped rigidly between the flanges, $D^1$ and $D^2$, of the metal hub. There may be as many as desired of these wooden spokes, C, radiating from the hub, D.

The circular peripheral member, A, is usually made by first hooping up and welding the ends of a metal channel bar (either hot or cold rolled) of the sectional shape, best disclosed in sectional Fig. 4. The peripheral member, A, then comprises the cylindrical middle section, 2, and two inwardly-turned or radial flanges, 3 and 4. As shown, the member, A, presents a cylindrical outer periphery, 5, and a cylindrical inner periphery, 6, circumferentially parallel to the outer periphery, 5, and lying between the flanges, 3 and 4. The outer or front flange, 3, remains undisturbed, but the rear flange, 4, is specially shaped in order that the wheel body (composed of the spokes C) and the peripheral member, A, can readily be assembled in the manner hereinbefore described. The flange, 4, contains a notch for each spoke of the wheel. Instead of cutting away the metal to form these notches in the flange, 4, I shear those portions from the part, 2, and press them back to form the bracket-like shoulders, 8, of which there are two for each notch, 7. The gap between the two brackets or shoulders, 8, of each pair is just sufficient to admit the end of the spoke, C, and these therefore serve as abutments against the sides of the spoke. These abutments, 6, therefore afford an ideal circumferential driving engagement between the spokes and the member, A, as best indicated at the point, G, in Fig. 3.

Each spoke, as well shown in Fig. 2, extends from the metal hub to the inner periphery, 6, of the member, A. I do not follow ordinary methods in assembling the parts of this wheel. Instead, I first assemble the spokes, C, as a unit, and then drive the same axially into the member, A, the end of each spoke passing into its notch, 7, between the abutments, 8, and finally pressing against the inner side of the flange, 3. The member, A, is of a circumference determined by the internal circumference of the rim B; and in turn the length of the spoke, C, is determined by the distance between the hub and the inner periphery of the member, A. By preference the spokes are made slightly longer than would seem to be necessary. This affords two valuable results when the spokes are pressed into the member, A, to-wit: The wheel body is compressed radially and the peripheral member is put under considerable circumferential tension, which insures the tightness of the wheel under all conditions. By preference I make the depth of the spokes to equal the distance between the inner side of the flange, 3, and the innermost edge of the cylindrical portion, 2, whereby the pressure of the member, A, is distributed upon the full end of the spoke.

For many uses it will be sufficient merely to press the spoke body into the metal member, A, in the manner described, and then secure the spoke body upon the hub, there being little likelihood of looseness developing between the spokes and the member, A, particularly after the endless metal band or rim, B, is pressed upon the latter. However, I much prefer to positively tie the end of each spoke to the metal member, A. To this end I employ in the end of each spoke one or more rivets, E, passing same through holes bored in the wooden spokes and through the flange, 3, of the member, A. Preferably the back of each spoke is protected by a washer plate, 9, and the rivet at the back is headed over this plate, and at the front end is headed upon the metal flange, 3. A neat appearance is secured by making the plates, 9, of a shape and size to substantially fill the gaps, 7, in which the spoke-ends are placed. A wheel thus constructed is extremely strong, and so resilient as to insure long life for the tire.

That solid tires need not always be used upon these wheels is indicated in Fig. 5. The construction of the wheel proper is the same as above described, except that the spokes, C', are shorter and deeper, and the member, A', is of less diameter. These changes in dimension are made necessary by the employment of the large pneumatic tire, H, and its flanged metal rim, I. The latter may be of any desired construction, so long as it is provided with a detachable flange, I', to permit the removal and replacement of the tire, H. The body of the rim is endless and it is pressed on the member, A', in the same manner as before described and requires no other fastening thereon.

My novel wheel may be adapted for use with demountable rims and heavy inflated truck tires, by a change so simple as to seem obvious. The change referred to comprises the rolling of the channel section (constituting the member, A) with an outer periphery, 10, such as is required for the reception of a demountable rim, J, as indicated in Figs. 6 and 7. The outer periphery, 10, may be of any desired shape; as required to suit different demountable rims. For use with demountable rims, I substitute rim-clamping bolts, 11, for some or all of the spoke-fastening rivets before described, and use with said bolts an equal number of clamping lugs, 12, or an equivalent rim-clamping ring.

My invention is not limited to the employment of the rectangular channel shape for the member A. Said member may have other cross-sectional shapes, as indicated in Fig. 8.

Preferably all of the necessary holes are punched in the peripheral member before the spokes are punched therein. If desired, drain or clearance holes, $a^2$, may also be bored or punched in the radial flanges of the peripheral member at the same time that the rivet or bolt holes are made therein.

From the foregoing description it will be clear that in this wheel I have attained the several objects set forth in the opening of this specification. The wheel has many advantages that may not at once be apparent, but which will be appreciated by those who make and use it. By reason of the increased length of the wooden spokes the wheel is much more resilient than the common wheel whether having a wooden or a metal felly. The peripheral member is of little more weight than the metal felly band of an ordinary wheel of the same size; and obviously I have eliminated both the cost and the weight of the felly which has so long been considered an essential part of a motor vehicle wheel. My novel wheel is much stronger than the ordinary wheel, and is of better appearance. It is easier to keep clean. It is little if at all affected by climatic changes for, as is well known, wooden spokes do not materially change their length when wetted and dried, and the contact of wood upon wood is eliminated. Furthermore, the inherent resilience imparted to the peripheral member in the act of pressing the spokes into place as described, insures constant and tight contact between that member and the ends of the spokes even in the absence of metal fastenings.

Having thus described my invention, I claim as new and desire to secure by Letters Patent:—

1. A semi-wood motor truck wheel, comprising a metal hub, in combination with a wheel body composed of wooden spokes radiating from said hub, and a tire rim receiving metal band tensioned directly upon the ends of said spokes, said band being of channel form in cross-section, with its flanges extending toward the wheel center, and one of said flanges being formed to admit the ends of the spokes.

2. A semi-wood motor truck wheel, comprising a metal hub, in combination with a wheel body composed of wooden spokes radiating from said hub, and a tire rim receiving metal band tensioned directly upon the ends of said spokes, said band being of channel form in cross-section, with its flanges extending toward the wheel center, and one of said flanges being notched and shaped into abutments to receive the ends of said spokes.

3. A semi-wood wheel for motor trucks, comprising a peripheral metal member of channel-like cross section having flanges which extend inwardly and one flange of which is notched and shouldered at regular intervals, in combination with a wheel body composed of radial wooden spokes having their ends pressed into said peripheral member through respective notches therein, and rivets additionally securing each spoke end to the unnotched flange.

In testimony whereof, I have hereunto set my hand this 14 day of May, 1918.

ERLE KING BAKER.